(12) United States Patent
Kim et al.

(10) Patent No.: US 11,214,240 B2
(45) Date of Patent: Jan. 4, 2022

(54) ELECTRIC OIL PUMP SYSTEM

(71) Applicants: Hyundai Motor Company, Seoul (KR); Kia Motors Corporation, Seoul (KR)

(72) Inventors: Gyeong Cheol Kim, Gyeonggi-do (KR); Sang Hyun Jeong, Gyeonggi-do (KR); Jong Hyun Kim, Gyeonggi-do (KR); Hak Sung Lee, Gyeonggi-do (KR); Seong Hwan Kim, Gyeonggi-do (KR); Dae Won Yang, Gyeonggi-do (KR); Seung Jae Kang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 226 days.

(21) Appl. No.: 16/209,552

(22) Filed: Dec. 4, 2018

(65) Prior Publication Data
US 2019/0367004 A1 Dec. 5, 2019

(30) Foreign Application Priority Data
May 30, 2018 (KR) .......................... 10-2018-0061464

(51) Int. Cl.
*B60W 10/30* (2006.01)
*B60W 20/15* (2016.01)
(Continued)

(52) U.S. Cl.
CPC .............. *B60W 10/30* (2013.01); *B60K 6/26* (2013.01); *B60K 6/48* (2013.01); *B60K 23/00* (2013.01); *B60W 20/15* (2016.01); *F01M 1/12* (2013.01); *F01M 5/002* (2013.01); *F01P 1/06* (2013.01); *F01P 3/12* (2013.01); *F01P 3/20* (2013.01); *F01P 9/04* (2013.01); *F16H 57/0417* (2013.01); *F16H 57/0435* (2013.01);
(Continued)

(58) Field of Classification Search
CPC ...... B60W 10/30; B60W 20/15; F01M 5/002; F01M 1/12; F01M 2001/0215; F16H 57/0435; F16H 57/0417; F16H 57/0446; F16H 61/0031; F16H 57/0441; F01P 1/06; F01P 3/20; F01P 3/12; F01P 9/04; B60K 23/00; B60K 6/48; B60K 6/26
See application file for complete search history.

(56) References Cited

U.S. PATENT DOCUMENTS

| 5,217,085 | A | * | 6/1993 | Barrie | ...................... F01M 1/16 165/297 |
|---|---|---|---|---|---|
| 10,272,767 | B1 | * | 4/2019 | Tang | ........................ F01P 7/164 |
| 10,457,135 | B2 | * | 10/2019 | Tang | .......................... F01P 5/10 |

* cited by examiner

*Primary Examiner* — Bryan M Lettman
(74) *Attorney, Agent, or Firm* — Mintz Levin Cohn Ferris Glovsky and Popeo, P.C.; Peter F. Corless

(57) ABSTRACT

An electric oil pump system allows the cooling of an electric oil pump (EOP) and an oil pump controller (OPU) to be performed efficiently in the vehicle equipped with the electric oil pump. An electric oil pump of the system includes a pumping part that is operated by power of a motor to suction and direct pressurized oil. An oil pump controller operates the electric oil pump. A water-cooled cooling apparatus cools the oil pump controller using coolant and an oil-cooled cooling apparatus cools the electric oil pump using oil. The coolant of the water-cooled cooling apparatus and the oil of the oil-cooled cooling apparatus pass through a heat exchanger and as the coolant and oil pass therethrough, heat exchange is achieved.

10 Claims, 4 Drawing Sheets

(51) Int. Cl.
  *B60K 6/48* (2007.10)
  *B60K 6/26* (2007.10)
  *F16H 61/00* (2006.01)
  *B60K 23/00* (2006.01)
  *F01P 1/06* (2006.01)
  *F01P 3/20* (2006.01)
  *F01P 3/12* (2006.01)
  *F01P 9/04* (2006.01)
  *F16H 57/04* (2010.01)
  *F01M 5/00* (2006.01)
  *F01M 1/12* (2006.01)
  *F01M 1/02* (2006.01)

(52) U.S. Cl.
  CPC ..... *F16H 57/0446* (2013.01); *F16H 61/0031* (2013.01); *F01M 2001/0215* (2013.01); *F16H 57/0441* (2013.01)

ELECTRIC OIL PUMP SYSTEM

CROSS-REFERENCE TO RELATED APPLICATION

This application claims under 35 U.S.C. § 119(a) the benefit of priority to Korean Patent Application No. 10-2018-0061464 filed on May 30, 2018, the entire contents of which are incorporated herein by reference.

BACKGROUND

(a) Technical Field

The present disclosure relates to an oil pump system of a vehicle, and more particularly, an electric oil pump system that cools an electric oil pump (EOP) and an oil pump control unit (OPU) to be performed efficiently in the vehicle equipped with the electric oil pump.

(b) Background Art

In a conventional engine vehicle such as a gasoline engine vehicle or a diesel engine vehicle, a mechanical oil pump (MOP) has been used, which is connected to an engine and driven by engine power, whereas an electric oil pump (EOP) has been used in eco-friendly vehicles where there is no engine or engine use is limited. For example, a hybrid vehicle has been equipped with an oil pump that directs and supplies pressurized oil required to drive engine clutches and transmissions, etc. Since an electric vehicle driving mode not using an engine, that is, an electric vehicle (EV) mode is provided at the hybrid vehicle, an mechanical oil pump (MOP) driven by engine power and an electric oil pump (EOP) driven by a motor power have been provided together.

Recently, in the hybrid vehicle, the mechanical oil pump has been eliminated or the capacity thereof has been reduced to improve the fuel efficiency and the use area and frequency of the electric oil pump has been increasing. The electric oil pump in the vehicle has been operated by a separate motor irrespective of the engine that drives the vehicle, providing an advantage of adjusting the supply flow amount of the oil.

The electric oil pump has been applied to the hybrid electric vehicle (HEV) and also an eco-friendly vehicle that uses a motor as a vehicle drive source without engine, for example, a fuel cell electric vehicle (FCEV) that operates by driving a motor with electric power generated by a fuel cell or a pure electric vehicle (EV) that operates by driving a motor with the charging power of a battery. In addition, in the vehicle using the electric oil pump (hereinafter, refer to as "EOP"), for example, in the hybrid vehicle, the EOP and an oil pump control unit (OPU), which is a type of controller that operates the EOP, have been provided.

FIG. 1 shows an example of using the mechanical oil pump (MOP) and the EOP together according to the related art. As shown in FIG. 1, a MOP 3 and an EOP 4 suction the oil stored in an oil pan 1 through a strainer 2 and direct the pressurized oil to a valve body 7, and the directed pressurized oil is supplied to a transmission 8 through the valve body 7.

The EOP 4 includes a motor 4a and a pumping part 4b of which a rotor is rotated by the power of the motor 4a to suction and direct pressurized oil and the motor 4a is operated by an oil pump control unit 5. In the EOP 4, the rotating shaft of the motor 4a and the rotor of the pumping part 4b are mechanically connected to transmit torque. The oil pump control unit (hereinafter referred to as "OPU") 5 includes a power element (i.e. switching element) such as an IGBT for operating the motor 4a of the EOP 4, a power module and a relay for connecting or disconnecting power supply, and the like. Since the OPU 5 includes the power element, power module and relay that generate heat during operation, cooling is required.

FIG. 2 schematically shows the configuration of a hybrid vehicle and shows the configuration of a parallel type hybrid electric vehicle (HEV) equipped with the EOP and an automatic transmission (AT) according to the related art. As shown in FIG. 2, in recent hybrid vehicle, the existing MOP that is connected to the engine is eliminated to improve fuel efficiency, and an EOP, capable of optimizing the flow rate supply, has been used alone.

Referring to FIG. 2, the hybrid vehicle includes an engine 11 and a motor 13 as vehicle driving source, an engine clutch 12 arranged to connect or disconnect the power between the engine 11 and the motor 13, a transmission 14 for shifting the power of the engine 11 and the motor 13 to transmit a drive shaft 15 and a hybrid starter and generator (hereinafter referred to as "HSG") 16 connected with the engine 11 to be capable of power delivery. Further, a battery 18 as vehicle driving source (electric power source) is connected to the motor 13 and the HSG 16 through an inverter 17 to be charged or discharged. To operate the motor 13 and the HSG 16, the inverter 17 converts the direct current of the battery 18 into a three-phase alternating current (AC) and applies the AC current to the motor and the HSG. In addition, the OPU 20 is provided separately from the EOP 19, and a water-cooled cooling system is used for cooling the OPU 20 in the prior art.

In other words, when a water pump (electric water pump, EWP) 23 is driven to suction and direct the pressurized coolant, the directed coolant circulates a coolant line 24 between the OPU 20, a radiator 21 and a reservoir 22 to cool the OPU 20. On the other hand, the EOP 19 operated by the OPU 20 is also driven by a motor to require cooling. As a result, a technique capable of efficiently cooling the EOP 19 and OPU 20 in the vehicle has been required.

The above information disclosed in this section is merely for enhancement of understanding of the background of the invention and therefore it may contain information that does not form the prior art that is already known in this country to a person of ordinary skill in the art.

SUMMARY

Accordingly, the present disclosure provides an electric oil pump system in which the cooling of an electric oil pump (EOP) and an oil pump control unit (OPU) may be efficiently performed.

In order to achieve the above objects, an electric oil pump system according to an exemplary embodiment of the present disclosure may include, an electric oil pump in which a pumping part is operated by power of a motor to suction and direct pressurized oil; an oil pump controller configured to operate the electric oil pump; a water-cooled cooling apparatus configured to cool the oil pump controller using coolant; an oil-cooled cooling apparatus configured to cool the electric oil pump using oil; and a heat exchanger provided that allow the coolant of the water-cooled cooling apparatus and the oil of the oil-cooled cooling apparatus to pass through therein and heat exchange is achieved between the passing through coolant and oil.

In an exemplary embodiment, the electric oil pump may be an oil pump configured to direct the sucked, pressurized oil to a valve body to supply the oil to a transmission through the valve body. Furthermore, the electric oil pump and the oil pump controller may be composed of an integral structure with integrally coupled with each other with the heat exchanger interposed therebetween.

In addition, the water-cooled cooling apparatus may include a radiator configured to emit heat of the coolant; a coolant line that connects the radiator with the heat exchanger; and a water pump configured to suction and direct the pressurized coolant to circulate along the coolant line between the radiator and the heat exchanger. Additionally, the heat exchanger may include a coolant flow path through which the coolant passes; and the heat exchanger and the oil pump controller may be integrally coupled with each other to be heat-transferable so that cooling the oil pump controller may be achieved by the coolant passing through the coolant flow path of the heat exchanger.

Further, the oil-cooled cooling apparatus may include a first oil flow path formed in the electric oil pump to divide a part of oil among the directed pressurized oil from the electric oil pump to flow in the heat exchanger; a second oil flow path being formed in the heat exchanger, connected with the first oil flow path and allowing heat exchange between the passing oil and the coolant passing through the coolant path of the heat exchanger while the oil flowing into from the first oil flow path passes; and a third oil flow path being formed in the electric oil pump, connected with the second oil flow path and allowing the cooling of the motor of the electric oil pump while the oil flowing into from the second oil flow path passes.

In addition, a suction port in which the oil is suction and flowed and an exhaust port from which the directed pressurized oil is exhausted may be provided at the pumping part of the electric oil pump; and the first oil flow path may be divided from an outlet port side flow path connected from the pumping part of the electric oil pump to the exhaust port to allow the pressurized oil directed to the exhaust port to flow and connected with the second oil flow path in the heat exchanger.

The third oil flow path may be connected to the second oil flow path in the heat exchanger from an inlet port side flow path which is connected with the suction port at the pumping part of the electric oil pump to allow the oil suctioned from the suction port to flow. Therefore, in accordance with the electric oil pump system according to the present disclosure, the cooled oil through the heat exchange with the coolant cools the motor of the EOP, which may increase the motor efficiency and increase the current density in the motor, thereby enabling design changes such as size reduction.

As a result, the cost savings of the pump motor may be achieved, and the fuel efficiency improvement may be expected by increasing the efficiency of the pump motor. In addition, by integrating the OPU and EOP, it may be possible to minimize the use of the wire (cable) connecting both sides, thereby achieving cost reduction and weight reduction, and reducing the emission of electromagnetic wave noise through the wire, to thus improve the electromagnetic wave performance. Furthermore, the electrical loss due to the may be is minimized, which leads to the improvement of motor efficiency and fuel efficiency.

BRIEF DESCRIPTION OF THE DRAWINGS

The above and other features of the present disclosure will now be described in detail with reference to certain exemplary embodiments thereof illustrated the accompanying drawings which are given herein below by way of illustration only, and thus are not limitative of the present disclosure, and wherein.

Figure 1:
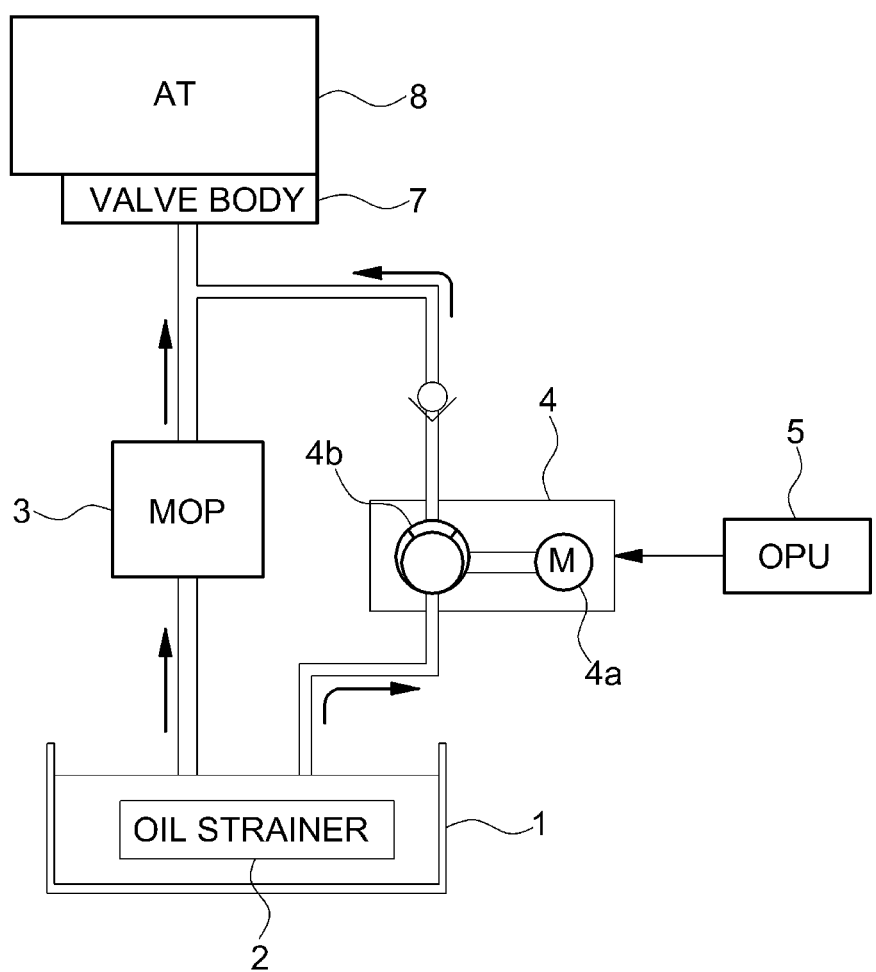
FIG. 1 is a schematic diagram illustrating a conventional oil pump system using a mechanical oil pump and an electric oil pump together according to the related art.

It should be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, an exemplary embodiment of the present disclosure will be described in detail with reference to accompanying drawings so that those skilled in the art can easily carry out the present disclosure. However, the present disclosure is not limited to the exemplary embodiment described herein but may be embodied in other forms.

Figure 3:
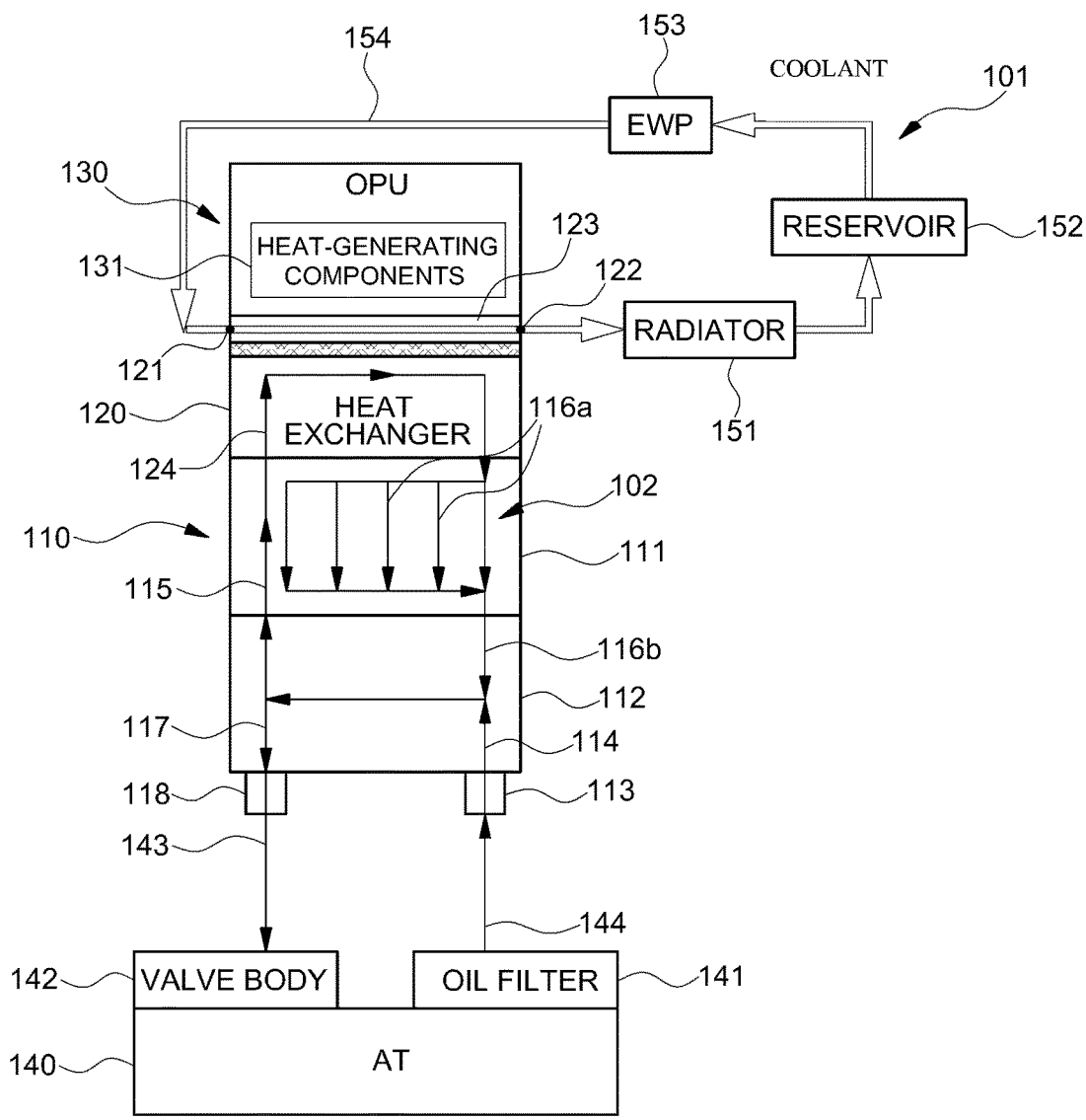
FIG. 3 is a drawing illustrating the configuration of an electric oil pump system according to an exemplary embodiment of the present disclosure.

FIG. 3 is a drawing illustrating the configuration of an electric oil pump system according to an exemplary embodiment of the present disclosure. The present disclosure provides an electric oil pump system in which cooling of an electric oil pump (EOP) 110 and an oil pump control unit (OPU) 130 may be efficiently performed. The vehicle equipped with the electric oil pump system of the present disclosure may be an eco-friendly vehicle such as a hybrid vehicle, a fuel cell vehicle, or a pure electric vehicle as well as a vehicle using a conventional electric oil pump.

In the present disclosure, the electric oil pump 110 may be driven by a motor 111, and include the motor 111 configured to receive power from a battery via the oil pump controller 130 to be driven and a pumping part 112 of which a rotor may be rotated by the power of the motor 111 to suction and send (e.g., direct, transmit, etc.) pressurized oil. At the electric oil pump 110, the rotation axis of the motor 111 and the rotor of the pumping part 112 may be mechanically connected with each other to transmit a torque. The configuration of the motor and the pumping part of the electric oil pump in the electric oil pump system of the present disclosure is not different from that of the conventional electric oil pump and is a well-known technical structure well known to those skilled in the art, the detailed description is omitted.

In the present disclosure, any electric oil pump in which a rotating shaft of a motor and a rotating shaft of a pumping part are connected to be able to transmit a torque to allow the pumping part to suction and direct pressurized oil when the rotor is rotated by the torque of the motor, may be applied and one of the known electric oil pumps may be adopted. For example, it may be possible to apply an internal gear type oil pump, which is a type of electric oil pump widely used in hybrid vehicles.

As well known, in the internal gear type oil pump as one type of rotary gear pump, the pumping part includes two rotors with the tooth shape, namely an inner rotor and an outer rotor, and the inner rotor is connected with the rotating shaft of the motor to be able to transmit a torque. In addition, the electric oil pump in the present disclosure may be in the form of a vane pump with a pumping part in which a vane is installed at a rotor or in the form of an external gear type pump with a pumping part in which a driving gear is installed at a rotor and the driving gear is engaged with a driven gear.

Furthermore, in the present disclosure, the electric oil pump 110 (hereinafter, referred to as "EOP") including the motor 111 and the pumping part 112 configured to suction oil through an oil filter 141 and then, direct the pressurized oil to a valve body 142 to supply the pressurized oil to a transmission 140 (Auto transmission, AT) via the valve body 142. In the electric oil pump 110, when the motor 111 is operated by the oil pump controller or control unit 130 (hereinafter, referred to as "OPU"), the pumping part 112 rotated by power of the motor 111 may be configured to suction the oil of the adjusted flow rate and transmit the pressurized oil.

In the present disclosure, the oil supplied by the EOP 110 may be used as an operating fluid in the automatic transmission 140 as described above, or may be used as an operating fluid in an engine clutch or the like, and may be used for the purpose of lubrication, cooling and providing hydraulic pressure in a vehicle. For example, when a motor is provided as vehicle driving source, that is, a drive motor for operating the vehicle, the motor may be cooled and lubricated by the oil supplied from the EOP 110 of the present disclosure, and a decelerator may be lubricated by the oil supplied from the EOP 110 of present disclosure.

The OPU 130 may include a power module for operating the motor 111 of the EOP 110 as an internal heat generating component 131, and a relay for connecting or disconnecting the power supply. Herein, the power module may include a plurality of power elements (i.e., switching elements) such as IGBT (Insulated/Isolated gate Bi-polar Transistors). As described above, the elements and parts of the OPU 130 are all heat generating components that emit heat during operation thus requiring cooling. In addition, the EOP 110 also has a motor 111 that emits heat from the coil and the like during driving, and thus, the motor components such as the coil require cooling as well.

Figure 2:
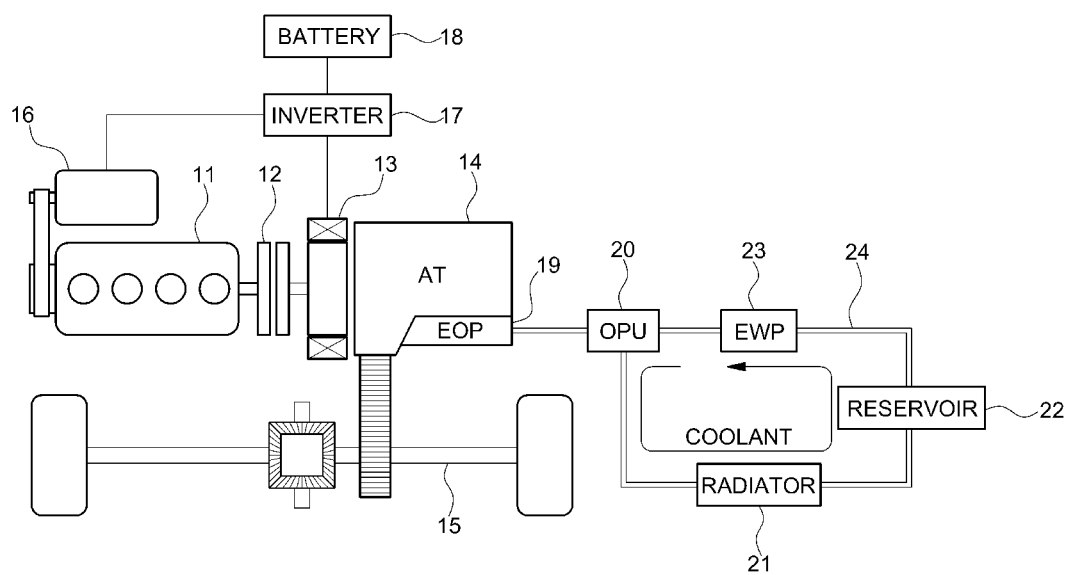
FIG. 2 is a drawing illustrating the construction of a parallel type hybrid electric vehicle (HEV) equipped with an electric oil pump and an automatic transmission according to the related art.

For the simultaneous cooling and efficient cooling of the OPU 130 and the EOP 110, in the present disclosure, the OPU 130 may be integrally combined with the EOP, 110 instead of the conventional EOP 110 which is separately configured with respect to the OPU 130 (refer to FIGS. 1 and 2), and the OPU 130 and EOP 110 may be integrally combined with each other by disposing a heat exchanger 120 therebetween. In addition, in the present disclosure, a cooling apparatus may be configured to cool the OPU 130 to be water-cooled and the EOP 110 to be oil-cooled.

In other words, as shown in FIG. 3, the electric oil pump system according to the present disclosure may include the EOP 110, the OPU 130 configured to operate the EOP 110, a water-cooled cooling apparatus 101 configured to cool the OPU 130, an oil-cooled apparatus 102 configured to cool the EOP 110 and a heat exchanger 120 configured to allow the coolant of the water-cooled cooling apparatus 101 and the oil of the oil-cooling apparatus 102 to pass through, respectively and to exchange heat between the coolant and the oil. Herein, the heat exchanger 120 may be integrated with the EOP 110 and OPU 130, and as in an exemplary embodiment the, the heat exchanger 120 may be integrated to be interposed between the OPU 130 and the EOP 110.

The water-cooled cooling apparatus 101 may have a cooling apparatus configuration for a conventional power electric parts (PE) that uses a coolant in the vehicle to cool the heat generating components. In other words, the water-cooled cooling apparatus 101 may include a radiator 151 configured to discharge the heat of the coolant, a reservoir 152 configured to store the coolant, a coolant line 154 that connects the radiator 151 and the reservoir 152 and the heat exchanger 120 and a water pump 153 configured to suction and direct pressurized oil to circulate along the coolant line 154. The water pump 153 may be an electric water pump (EWP). When the water pump 153 is operated to suction and transmit the pressurized coolant, the coolant may circulate along the coolant line 154 between the heat exchanger 120, radiator 151 and reservoir.

Although not shown in detail in FIG. 3, to allow the coolant to effectively absorb the heat generated by the heat-generating component 131, such as the power element of the OPU 130, coolant flow paths through which the coolant may flow in the case or housing of the OPU 130 may be provided. For example, the coolant flow paths in the form of a water jacket may be provided in the case or the housing and the coolant passing through the coolant flow paths absorbs the heat from the heat-generating components (e.g., a power device, a power module, a relay 131, and so on.) in the OPU 130 and thus, the cooling of the OPU 130 may be achieved.

Further, the coolant passing through the coolant flow paths of the OPU 130 performs heat exchange with the oil while passing through a coolant flow path 123 in the heat exchanger 120 thereafter and may be discharged from the heat exchanger 120 to flow toward the radiator 151 along the coolant line 154, and thus, the coolant may release heat while passing through the radiator 151. As is well known, the running air that flows into the vehicle during operation, or the air blown by a radiator fan (not shown) passes through the radiator 151, and heat exchange is achieved between the air passing around radiator pins and the coolant passing through a radiator core, and thus, heat may be released from the coolant.

In the above-described configuration, the case or housing of the OPU 130 may include an inlet port through which a coolant may flow into to cool the heat-generating component 131 such as a power device or a power module, and the inlet port may be connected to a coolant flow path (e.g., the coolant jacket) in the case or housing. The heat exchanger 120 may include an outlet port through which the coolant having undergone the cooing of the OPU 130 and heat exchange with the oil may be discharged.

The outlet port may be connected with the radiator 151 via the coolant line 154, to supply the coolant exhausted through the outlet port at the heat exchanger 120 to the radiator 151 via the coolant line 154. As a result, in the water-cooled cooling apparatus 101, when the water pump 153 is operate to direct the pressurized coolant, the directed coolant may move along the coolant line 154 and then, may flow into a coolant flow path in the case or housing of the OPU 130 through the inlet port to flow therein. This causes the coolant to cool the OPU 130 while the coolant flows through the coolant flow path, and the coolant receives heat during cooling the OPU 130 and then flows to the heat exchanger 120.

The coolant then undergoes heat exchange with the oil of the oil-cooled cooling apparatus 102 described below while passing through the heat exchanger 120, where heat is received from the oil. Additionally, the coolant may be exhausted from the heat exchanger 120 through the outlet port and then flows to the radiator 151 through the coolant line. The coolant may be cooled by releasing heat from the radiator 151 and then moved to the reservoir 152, and then, the pressurized coolant may suctioned and directed again by the water pump 153 to circulate along the coolant line 154. In this circulation process, the OPU 130 may be continuously cooled by the coolant.

Additionally, in the heat exchanger 120, the oil may be cooled by heat exchange with the coolant, and then the oil cooled in the heat exchanger 120 may be circulated through the oil-cooled cooling apparatus 102 to cool the motor 111 of the EOP 110. In the above description, the coolant may flow to the heat exchanger 120 after passing through the coolant flow path (water jacket) in the case or housing of the OPU 130, but as shown in FIG. 3, the coolant may be supplied directly to the heat exchanger 120 through the coolant line 154.

An inlet port 121 in which the coolant flows into the heat exchanger 120 and the outlet port 122 in which the coolant after undergoing cooling the OPU 130 and heat exchange with oil is exhausted may both be provided. The inlet port 121 of the heat exchanger 120 may be connected with the water pump 153 through the coolant line 154 and the outlet port 122 of the heat exchanger 120 may be connected with the radiator 151 through the coolant line 154. In particular, while the coolant passes through the coolant flow path 123 in the heat exchanger 120, the coolant absorbs the heat generated by the OPU 130, and this coolant also exchanges heat with oil passing through an oil flow path 124 in the heat exchanger 120.

In such a configuration, the heat exchanger 120 and the OPU 130 may be integrated to be in heat-transferable contact state to cool a heat-generating component 131 of the OPU 130 by the coolant passing through the heat exchanger 120. Then, according to the heat exchange of the coolant and the oil in the heat exchanger 120, the coolant receives heat from the oil that has cooled the motor 111 of the EOP 110, and the oil may be cooled by the coolant in the heat exchanger 120.

On the other hand, in the oil-cooled cooling apparatus 102, an oil flow path may be configured so that the directed, pressurized oil by the EOP 110, that is, a part of oil to be supplied to the transmission 140 by the EOP 110 may be divided inside the EOP 110 to flow to the heat exchanger 120, and the oil flow pass may be configured so that the oil moves to the inside of the motor side of the EOP 110 to cool the motor 111 after the divided oil passes through the heat exchanger 120. In particular, the pumping part 112 of the EOP 110 may include a suction port 113 through which oil may be suctioned and an exhaust port 118 through which pressurized oil may be directed and exhausted.

The suction port 113 may be connected with an oil filter 141 side through an oil line 144 to allow the oil circulated through the automatic transmission 140 to be suctioned through the oil filter 141. The exhaust port 118 may be connected via the oil line 143 to the valve body 142 to supply the pressurized oil to the automatic transmission 140 via the valve body 142. Further, the oil flow path of the oil-cooled cooling apparatus 102 may have a flow path configuration that is divided from an outlet port side flow path 117 of the pumping part 112 to which the pressurized oil is directed, that is, divided from the outlet port side flow path 117 which is connected to the exhaust port at the pumping part 112 and passes through the motor 111, the heat exchanger 120 and the inside of the motor 111 again to connect with an inlet port side flow path 114.

In other words, the oil-cooled cooling apparatus 102 may include a first oil flow path 115 in which a part of pressurized oil directed by the EOP 110 may be divided inside the EOP 110 to flow toward the heat exchanger 120, a second oil flow path 124 provided inside the heat exchanger 120 and connected with the first oil flow path 115 and third oil flow paths 116a and 116b provided inside the EOP 110 to allow the oil for cooling the motor 111 to pass through and the third oil flow paths 116a and 116b may be connected with the second oil flow path 124. Herein, the first oil flow path 115 may be divided from the outlet port side flow path 117 of the pumping part 112 to which pressurized oil is directed.

Therefore, a part of oil (e.g., a first portion) among the pressurized oil at the pumping part 112 may flow at the outlet port side flow path 117 toward the first oil flow path 115, and the other oil (e.g., a second portion) may be exhausted at the outlet port side flow path 117 through the exhaust port 118 of the pumping part 112 to be directed toward the valve body 142. Further, the first oil flow path 115 may be connected with the second oil flow path 124 as the oil flow path of the inside of heat exchanger 120 and the second oil flow path 124 may be connected with the third oil flow paths 116a and 116b as the oil flow path for cooling the motor 111.

The third oil flow path may include a plurality of divided flow paths 116a and the flow path 116b formed by joining the divided flow paths again, the joined flow path 116b may be connected with the inlet port side flow path 114 of the pumping part 112 in which oil is suctioned, that is, the inlet port side flow path 114 connected with the suction port 113.

As shown in FIG. 3, inside the motor 111 of the EOP 110, the plurality of divided flow paths 116a may be formed inside the housing at the motor 111 side and positioned outside a rotor and a stator (not shown) to surround those. The oil passing through the divided flow paths 116a may pass through the joined flow pass 116b later. Therefore, a part of oil among the pressurized oil directed from the pumping part 112 of the EOP 110 to the outlet port side flow path 117 may be divided to flow toward the first oil flow path 115, and the other pressurized oil may be directed to the valve body 142 and then supplied to the automatic transmission 140.

As described above, the oil divided to the first oil flow path 115 and flowing therein may pass through the second oil flow path 124 inside the heat exchanger 120. At this time, the oil may exchange heat with the coolant passing through the coolant flow path 123 inside the heat exchanger 120 while passing through the second oil flow path 124 inside heat exchanger 120. Since the coolant in the vehicle is maintained below a specific temperature (e.g. about 80° C.), the coolant may cool the oil in the heat exchanger 120 to thus cool the oil by heat exchange with the coolant while passing through the second oil flow path 124 in the heat exchanger 120.

Thereafter, the cooled oil may cool the motor 111 while passing through the divided flow paths 116a inside the housing of the motor 111 side, and the oil having cooled the motor 111 may flow toward the inlet port side flow path 114 of the pumping part 112 through the flow path 116b joined thereafter and then, combined at the inlet port side flow path 114 with the suctioned oil from the automatic transmission 140 through the suction port 113 to be directed under pressure toward the outlet port side flow path 117 of the pumping part 112. Thus, in the electric oil pump system according to the present disclosure, the coolant circulated by the water pump 153 may cool the heat-generating components 131 of the OPU 130, and the oil circulated by the EOP 110 may cool the motor 111 of the EOP 110.

Furthermore, in the heat exchanger 120, heat exchange occurs between the coolant and the oil, where the oil may be cooled by the coolant and the coolant passing through the heat exchanger then may be discharged from the radiator 151. In the present disclosure, the oil cooled by the heat exchange with the coolant may cool the motor of the EOP, to increase the motor efficiency and increase the current density in the motor to allow design changes such as size reduction. As a result, it may be possible to achieve the cost reduction of the pump motor and the effect of the fuel efficiency improvement by the increase of the efficiency of the pump motor.

In addition, by integrating the OPU and EOP together, it may be possible to minimize the use of a wire (cable) connecting both sides, thereby achieving cost and weight reduction and reducing the emission of electromagnetic wave noise through the wire to improve electromagnetic waves performance. Furthermore, the electrical loss due to the wire may be minimized, which leads to the improvement of motor efficiency and fuel efficiency.

Figure 4:
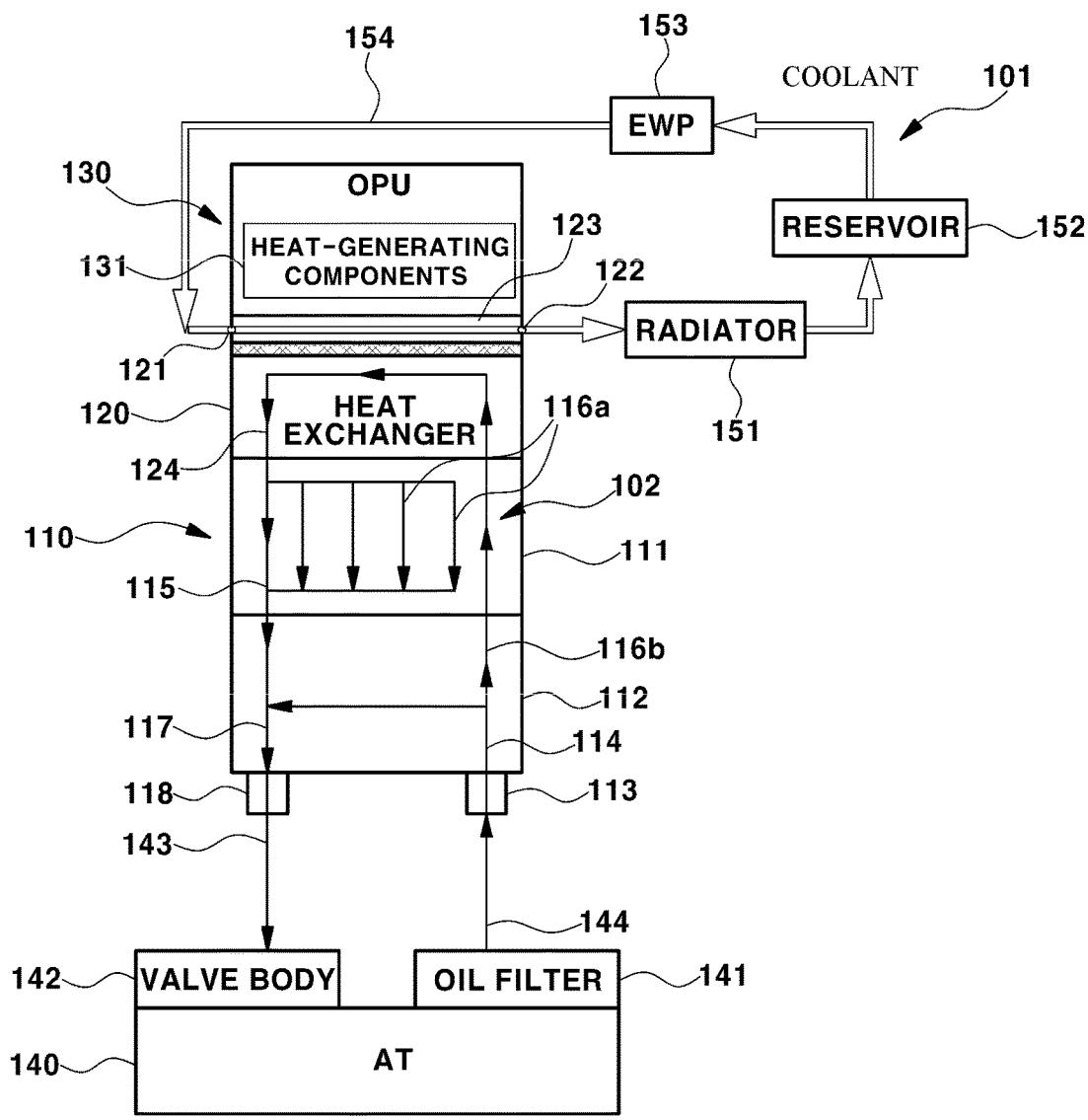
FIG. 4 is a drawing illustrating the configuration of an electric oil pump system according to another exemplary embodiment of the present disclosure.

On the other hand, FIG. 4 is a perspective diagram of an electric oil pump system according to another exemplary embodiment of the present disclosure, illustrating the configuration of an exemplary embodiment in which the direction and route of the oil flowing are different.

As shown in FIG. 4, the direction and route of oil flowing are different to the direction and route of oil flowing in the pumping part 112 and the motor 111, and in the heat exchanger 120. As shown, oil is made to flow opposite to the exemplary embodiment illustrated in FIG. 3 in the motor 111 and the heat exchanger 120.

Even in FIG. 4, the coolant circulated by the water pump 153 cools the heat generating component 131, and the oil circulated by EOP 110 may cool the motor 111 of EOP 110.

Furthermore, in the heat exchanger 120, heat exchange occurs between the coolant and the oil, where the oil may be cooled by the coolant and the coolant passing through the heat exchanger then may discharge heat from the radiator 151.

Although the present disclosure has been described with reference to an exemplary embodiment, it is to be understood that a person skilled in the art may modify and change the elements of the present disclosure within the range of the present disclosure. In addition, many changes can be made to specific situations or materials within a range that does not deviate from the essential areas of the present disclosure. The present disclosure, therefore, is not to be limited to the detailed description of the exemplary embodiments of the present disclosure, but will include all embodiments within the scope of the appended claims.

What is claimed is:

1. An electric oil pump system, comprising:
    an electric oil pump in which a pumping part is operated by power of a motor to suction and direct pressurized oil;
    an oil pump controller configured to operate the electric oil pump;
    a water-cooled cooling apparatus configured to cool the oil pump controller using coolant;
    an oil-cooled cooling apparatus configured to cool the electric oil pump using oil; and
    a heat exchanger, wherein the coolant of the water-cooled cooling apparatus and the oil of the oil-cooled cooling apparatus pass through the heat exchanger and heat exchange is achieved as the coolant and oil pass therethrough,
    wherein the oil-cooled cooling apparatus includes a flow path for cooling the motor,
    wherein the heat exchanger is disposed between the oil pump controller and the electric oil pump, and
    wherein the oil pump controller controls the motor.

2. The electric oil pump system of claim 1, wherein the electric oil pump is an oil pump configured to direct a suctioned pressurized oil to a valve body to supply the oil to a transmission through the valve body.

3. The electric oil pump system of claim 1, wherein the electric oil pump and the oil pump controller are composed of an integral structure with integrally coupled with each other and with the heat exchanger interposed therebetween.

4. The electric oil pump system of claim 1, wherein the water-cooled cooling apparatus includes:
    a radiator configured to emit heat of the coolant;
    a coolant line that connects the radiator with the heat exchanger; and
    a water pump configured to suction and direct a pressurized coolant to circulate along the coolant line between the radiator and the heat exchanger.

5. The electric oil pump system of claim 1, wherein the heat exchanger includes a coolant flow path through which the coolant passes.

6. The electric oil pump system of claim 5, wherein the heat exchanger and the oil pump controller are integrally coupled with each other to be heat-transferable to cool the oil pump controller by the coolant passing through the coolant flow path of the heat exchanger.

7. The electric oil pump system of claim 1, wherein the oil-cooled cooling apparatus includes:
- a first oil flow path formed in the electric oil pump and a first part of oil among the pressurized oil directed from the electric oil pump is divided to flow in the heat exchanger;
- a second oil flow path formed in the heat exchanger, connected with the first oil flow path and allowing heat exchange between the passing oil and the coolant passing through the coolant path of the heat exchanger while the oil flowing in from the first oil flow path passes; and
- a third oil flow path formed in the electric oil pump, connected with the second oil flow path and allowing the cooling of the motor of the electric oil pump while the oil flowing in from the second oil flow path passes.

8. The electric oil pump system of claim 7, wherein a suction port in which the oil is suctioned and an exhaust port from which the pressurized oil is exhausted are provided at the pumping part of the electric oil pump.

9. The electric oil pump system of claim 8, wherein the first oil flow path is divided from an outlet port side flow path which is connected from the pumping part of the electric oil pump to the exhaust port to allow the pressurized oil directed to the exhaust port to flow therein and wherein the first oil flow path is connected with the second oil flow path in the heat exchanger.

10. The electric oil pump system of claim 9, wherein the third oil flow path is joined with an inlet port side flow path which is connected with the suction port at the pumping part of the electric oil pump, and the oil flowing from the third oil flow path and the inlet port side flow path flows toward the outlet port side flow path of the pumping part.

* * * * *